United States Patent
Hayashi et al.

(10) Patent No.: US 12,066,823 B2
(45) Date of Patent: Aug. 20, 2024

(54) REMOTE CONTROL TERMINAL, AND WORKING VEHICLE PROVIDED WITH REMOTE CONTROL TERMINAL

(71) Applicant: TADANO LTD., Kagawa (JP)

(72) Inventors: Hiroyuki Hayashi, Kagawa (JP); Shinsuke Kanda, Kagawa (JP)

(73) Assignee: TADANO LTD., Kagawa (JP)

( * ) Notice: Subject to any disclaimer, the term of this patent is extended or adjusted under 35 U.S.C. 154(b) by 1005 days.

(21) Appl. No.: 16/977,695

(22) PCT Filed: Mar. 8, 2019

(86) PCT No.: PCT/JP2019/009279
§ 371 (c)(1),
(2) Date: Sep. 2, 2020

(87) PCT Pub. No.: WO2019/172407
PCT Pub. Date: Sep. 12, 2019

(65) Prior Publication Data
US 2020/0393827 A1    Dec. 17, 2020

(30) Foreign Application Priority Data

Mar. 9, 2018    (JP) .................................. 2018-043248

(51) Int. Cl.
*G05D 1/00*    (2024.01)
*B66C 13/16*    (2006.01)
(Continued)

(52) U.S. Cl.
CPC ........... *G05D 1/0016* (2013.01); *B66C 13/16* (2013.01); *B66C 13/40* (2013.01); *B66C 13/46* (2013.01);
(Continued)

(58) Field of Classification Search
CPC ......... B66C 13/16; B66C 13/40; B66C 13/46; B66F 11/04; B66F 9/07581; G05D 1/0016; G05D 1/0038
See application file for complete search history.

(56) References Cited

U.S. PATENT DOCUMENTS 6,778,097 B1 * 8/2004 Kajita ..................... E02F 3/437
342/426
7,055,447 B1 * 6/2006 Bekker ................... B63B 35/00
440/5
(Continued)

FOREIGN PATENT DOCUMENTS

| CN | 110062744 A | 7/2019 |
|----|-------------|--------|
| JP | H09-071386 A | 3/1997 |

(Continued)

OTHER PUBLICATIONS

May 14, 2019, International Search Report issued for related PCT application No. PCT/JP2019/009279.
(Continued)

*Primary Examiner* — Fadey S. Jabr
*Assistant Examiner* — Michael J Herrera
(74) *Attorney, Agent, or Firm* — Paratus Law Group, PLLC

(57) ABSTRACT

The purpose of the present invention is to provide: a remote control terminal which can perform a remote control on a working vehicle easily and simply; and a working vehicle provided with a remote control terminal. The present invention is provided with: a vehicle-side azimuth sensor (29) which detects the azimuth around a crane device (6); a remote control terminal (32) having a hung cargo movement control tool which is a first control part that remotely controls the crane device (6), and a reference change control tool (34) which is a second control tool that sets a reference for the azimuth in which the crane device (6) operates (Continued)

according to a control of the hung cargo movement control tool (35); and a control device (31) which is configured to be able to communicate with the remote control terminal (32) and controls the operation of the crane device (6), wherein the control device (31) causes the crane device (6) to operate in the azimuth in which the crane device (6) operates, when acquiring, from the remote control terminal (32), a signal of the azimuth in which the crane device (6) operates according to a control of the hung cargo movement control tool (35) and which is calculated on the basis of a set value of the reference change control tool (34).

4 Claims, 9 Drawing Sheets

(51) Int. Cl.
*B66C 13/40* (2006.01)
*B66C 13/46* (2006.01)
*B66F 9/075* (2006.01)
*B66F 11/04* (2006.01)

(52) U.S. Cl.
CPC ........ *G05D 1/0038* (2013.01); *B66F 9/07581* (2013.01); *B66F 11/04* (2013.01)

(56) References Cited

U.S. PATENT DOCUMENTS

| | | | |
|---|---|---|---|
| 2008/0091520 A1* | 4/2008 | Hatori | G01S 19/14 342/357.24 |
| 2012/0095653 A1* | 4/2012 | Morath | B66C 23/905 701/1 |
| 2013/0013144 A1* | 1/2013 | Tanizumi | B66C 23/905 701/34.4 |
| 2013/0345857 A1* | 12/2013 | Lee | B66C 13/48 700/229 |
| 2014/0278076 A1* | 9/2014 | Conquest | B66C 13/46 701/468 |
| 2014/0278078 A1* | 9/2014 | Cameron | G01S 19/53 701/468 |
| 2015/0142276 A1* | 5/2015 | Wu | E02F 9/2095 701/50 |
| 2015/0217449 A1* | 8/2015 | Meier | G05D 1/0088 901/1 |
| 2015/0217976 A1* | 8/2015 | Tanizumi | B66C 13/00 703/2 |
| 2015/0249821 A1* | 9/2015 | Tanizumi | G06T 7/593 348/46 |
| 2016/0034730 A1* | 2/2016 | Delplace | G06K 7/10366 340/8.1 |
| 2016/0121989 A1* | 5/2016 | Okuda | B63H 25/06 701/2 |
| 2016/0222630 A1* | 8/2016 | Friend | E04G 21/0463 |
| 2016/0318739 A1* | 11/2016 | Terata | B66C 15/065 |
| 2019/0322496 A1 | 10/2019 | Hayashi | |

FOREIGN PATENT DOCUMENTS

| | | |
|---|---|---|
| JP | 2005-089051 A | 4/2005 |
| JP | 2010-228905 A | 10/2010 |
| WO | WO 2008/099611 A1 | 8/2008 |
| WO | WO 2013/114737 A1 | 8/2013 |
| WO | WO 2018/110707 A1 | 6/2018 |

OTHER PUBLICATIONS

May 14, 2019, International Search Opinion issued for related PCT application No. PCT/JP2019/009279.

\* cited by examiner

REMOTE CONTROL TERMINAL, AND WORKING VEHICLE PROVIDED WITH REMOTE CONTROL TERMINAL

CROSS REFERENCE TO PRIOR APPLICATION

This application is a National Stage Patent Application of PCT International Patent Application No. PCT/JP2019/009279 (filed on Mar. 8, 2019) under 35 U.S.C. § 371, which claims priority to Japanese Patent Application No. 2018-043248 (filed on Mar. 9, 2018), which are all hereby incorporated by reference in their entirety.

TECHNICAL FIELD

The present invention is applicable to a remote operation terminal and a work vehicle provided with a remote operation terminal.

BACKGROUND ART

Hitherto, in work vehicles provided with a work apparatus, such as a mobile crane and an aerial work platform, work vehicles in which an actuator of the work apparatus is remotely operated and remote operation terminals for operating the actuator of the work apparatus have been proposed. In work using a remote operation terminal, a worker is able to perform work while checking the state of movement of a suspended load near the suspended load or at a target position of the suspended load, remote from an operation apparatus of the work apparatus.

In such a work vehicle, a relative positional relation between the work apparatus and the remote operation terminal varies in accordance with a work situation. Therefore, a worker who operates the work apparatus with the remote operation terminal needs to manipulate a manipulation tool of the remote operation terminal while constantly considering the relative positional relation with the work apparatus. Therefore, there is known a remote operation terminal that enables easy and simple operation of a work apparatus by bringing a movement direction of a manipulation tool of a remote operation terminal into coincidence with a movement direction of the work apparatus regardless of a relative positional relation between the work apparatus and the remote operation terminal. This is as described in, for example, Patent Literature (hereinafter, abbreviated as PTL) 1.

A remote operation apparatus (remote operation terminal) described in PTL 1 includes a signal transmission section that transmits as a reference signal a laser beam or the like having high straightness as a reference signal. A crane (work apparatus)-side control apparatus includes a reception section for a reference signal. The remote operation apparatus is configured such that the reference coordinate system of the manipulation tool coincides with a direction in which the reference signal is transmitted. The work machine crane-side control apparatus determines the orientation of the remote operation apparatus by receiving the reference signal from the remote operation apparatus with the reception section and brings the coordinate system of the crane into coincidence with the coordinate system of the remote operation apparatus. Thus, the movement direction of the manipulation tool of the remote operation apparatus and the movement direction of the crane coincide with each other, so it is possible to easily and simply operate the crane with the remote operation apparatus regardless of a relative positional relation between the crane and the remote operation apparatus.

The mobile crane described in Patent Literature 1 determines the orientation of the remote operation apparatus relative to the work machine by receiving a reference signal with the reception section and brings the reference coordinate system of the manipulation tool and the coordinate system of the work machine into coincidence with each other. Therefore, for large-size cranes in which the reception section of the mobile crane can be significantly remote from the remote operation apparatus, field sites where there are many obstacles, and the like, there have been cases where the reception section is not able to receive a reference signal and, therefore, it is not possible to bring the coordinate system of the mobile crane into coincidence with the coordinate system of the remote operation apparatus.

CITATION LIST

Patent Literature
PTL1
Japanese Patent Application Laid-Open No. 2010-228905

SUMMARY OF INVENTION

Technical Problem

It is an object of the present invention to provide a remote operation terminal that prevents erroneous manipulation during remote operation of a work apparatus and that enables easy and simple remote operation of the work apparatus, and a work vehicle provided with the remote operation terminal.

Solution to Problem

The technical problem to be solved by the present invention is as described above, and a solution to this problem will be described next.

More specifically, a work vehicle according to the present invention is provided with a work apparatus that is remotely operated, the work vehicle comprising: an azimuth detection section that detects an azimuth about the work apparatus; a remote operation terminal including a first manipulation section used to remotely operate the work apparatus and a second manipulation section used to set a reference of an azimuth in which the work apparatus moves as a result of manipulation of the first manipulation section; and a control apparatus that is configured to be capable of communicating with the remote operation terminal and that controls movement of the work apparatus, wherein when the control apparatus obtains, from the remote operation terminal, a signal of an azimuth in which the work apparatus moves for manipulation of the first manipulation section, the control apparatus preferably causes the work apparatus to move in the azimuth in which the work apparatus moves, the azimuth being calculated based on a set value of the second manipulation section.

In the work vehicle according to the present invention, the work machine is provided with a display section, and the control apparatus causes the display section to display the azimuth about the work apparatus, which is detected by the azimuth detection section, and when the control apparatus obtains, from the remote operation terminal, the signal of the azimuth in which the work apparatus moves, the control apparatus causes the display section to display the azimuth in which the work apparatus moves.

A remote operation terminal according to the present invention is a terminal for a work apparatus provided in a work vehicle, the remote operation terminal comprising: a control section that is configured to be capable of communicating with a control apparatus of the work apparatus and that controls operation of the remote operation terminal; a first manipulation section used to remotely operate the work apparatus; and a second manipulation section used to set a reference of an azimuth in which the work apparatus moves as a result of manipulation of the first manipulation section, wherein the control section calculates the azimuth in which the work apparatus moves for manipulation of the first manipulation section based on a set value of the second manipulation section, and transmits the azimuth to the control apparatus, and disables a change of the set value while the first manipulation section is being manipulated.

Advantageous Effects of Invention

The present invention provides advantageous effects as described below.

With the work vehicle and the remote operation terminal of the present invention, the remote operation terminal provides an instruction on a movement direction of the work apparatus by using an azimuth as a reference, so, as long as an operator identifies an azimuth, the operator does not lose the identified movement direction of the work apparatus for the manipulation direction of the first manipulation section while the operator is performing operation regardless of a positional relation between the work apparatus and the remote operation terminal. Thus, erroneous manipulation during remote operation of the work apparatus is prevented, and it is possible to easily and simply perform remote operation of the work apparatus.

With the work vehicle of the present invention, an operator changes a reference of the remote operation terminal in accordance with an azimuth displayed on the work apparatus and then operates the work apparatus while visually identifying the work apparatus, so the operator does not lose the identified movement direction of the work apparatus for the manipulation direction of the first manipulation section during operation. Thus, erroneous manipulation during remote operation of the work apparatus is prevented, and it is possible to easily and simply perform remote operation of the work apparatus.

DESCRIPTION OF EMBODIMENTS

Hereinafter, crane 1 that is a mobile crane (rough terrain crane) as a work vehicle according to an embodiment of the present invention will be described with reference to FIGS. 1 and 2. In the present embodiment, a crane (rough terrain crane) will be described as a work vehicle. Alternatively, an all-terrain crane, a truck crane, a loading truck crane, an aerial work platform, or the like may also be applied as a work vehicle.

Figure 1:
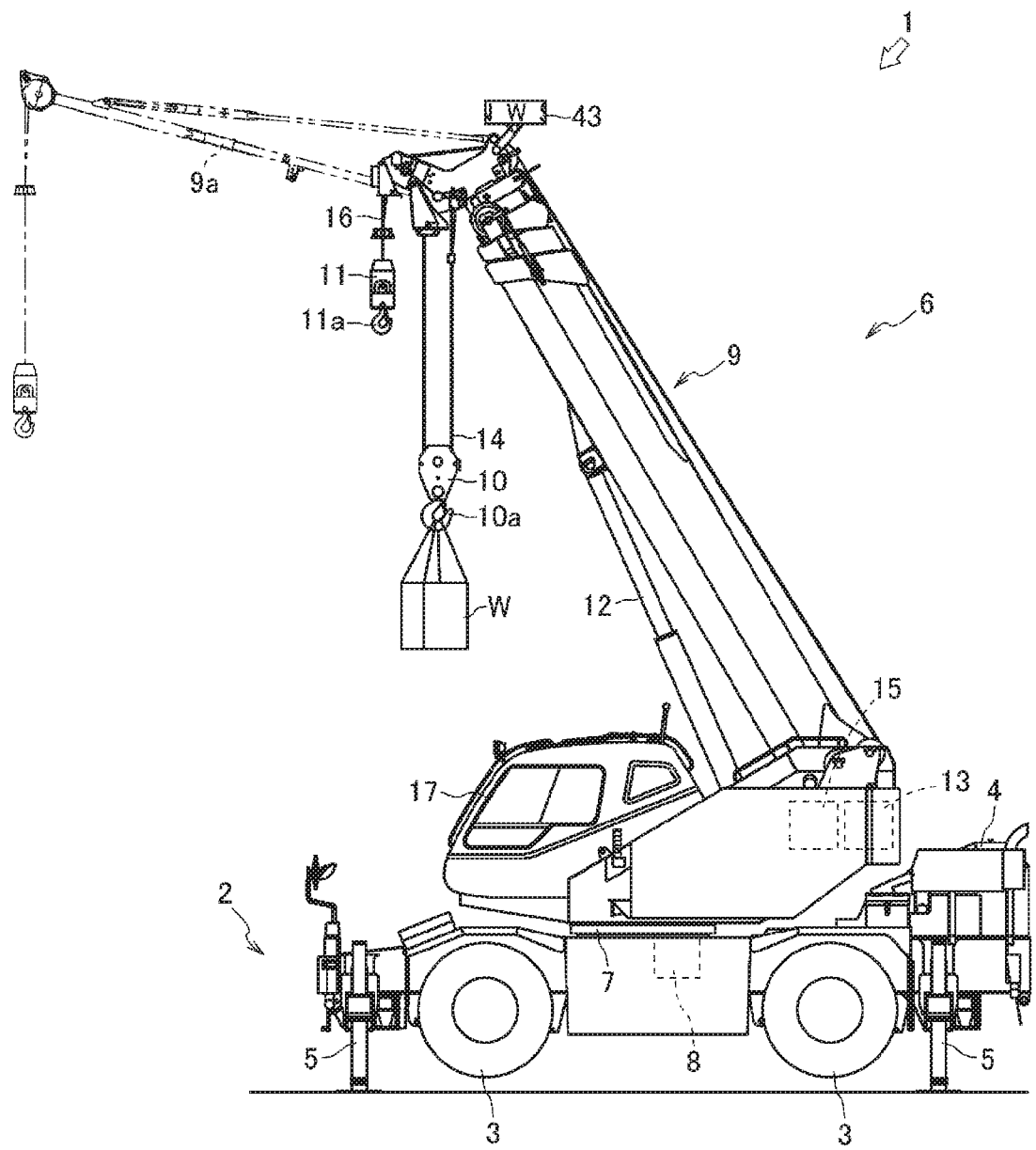
FIG. 1 is a side view illustrating the entire configuration of a crane.

As illustrated in FIG. 1, crane 1 is a mobile crane that is capable of moving to an unspecified place. Crane 1 includes vehicle 2, crane apparatus 6 that is a work apparatus, and remote operation terminal 32 (see FIG. 2) that enables remote operation of crane apparatus 6.

Vehicle 2 carries crane apparatus 6. Vehicle 2 includes a plurality of wheels 3 and travels by using engine 4 as a power source. Vehicle 2 is provided with outriggers 5. Outriggers 5 are made up of projecting beams hydraulically extendable on both sides of vehicle 2 in the width direction and hydraulic jack cylinders extendable in the direction vertical to the ground. Vehicle 2 is capable of extending a workable area of crane 1 by extending outriggers 5 in the width direction of vehicle 2 and bringing the jack cylinders into contact with the ground.

Crane apparatus 6 hoists upload W with a wire rope. Crane apparatus 6 includes swivel base 7, boom 9, jib 9a, main hook block 10, sub hook block 11, hydraulic luffing cylinder 12, main winch 13, main wire rope 14, sub winch 15, sub wire rope 16, cabin 17, and the like.

Swivel base 7 enables crane apparatus 6 to swivel. Swivel base 7 is provided on a frame of vehicle 2 via an annular bearing. Swivel base 7 is configured to be capable of rotating about the center of the annular bearing. Swivel base 7 is provided with hydraulic-type hydraulic swivel motor 8 that is an actuator. Swivel base 7 is configured to be capable of swiveling in one direction and the other direction by means of hydraulic swivel motor 8.

Hydraulic swivel motor 8 that is an actuator is operated to rotate by swiveling valve 23 (see FIG. 2) that is an electromagnetic proportional switching valve. Swiveling valve 23 is capable of controlling the flow rate of operating oil to be supplied to hydraulic swivel motor 8 to a selected flow rate. In other words, swivel base 7 is configured to be controllable to a selected swivel speed via hydraulic swivel motor 8 operated to rotate by swiveling valve 23. Swivel base 7 is provided with swiveling sensor 27 (see FIG. 2) that detects the swivel position (angle) and swivel speed of swivel base 7.

Boom 9 that is a boom supports the wire rope such that the wire rope is able to hoist up load W. Boom 9 is made up of a plurality of boom members. Boom 9 is provided such that the base end of a base boom member is swingably provided at substantially the center of swivel base 7. Boom 9 is configured to be capable of extending and retracting in the axial direction by moving the boom members with a hydraulic extension/retraction cylinder (not illustrated) that is an actuator. Boom 9 is provided with jib 9a. Jib 9a is held by a jib supporting part provided in the base boom member of boom 9 in a position along the base boom member. The base end of jib 9a is enabled to be coupled to a jib supporting part of a top boom member.

The hydraulic extension/retraction cylinder (not illustrated) that is an actuator is operated to extend and retract by extension/retraction valve 24 (see FIG. 2) that is an electromagnetic proportional switching valve. Extension/retraction valve 24 is capable of controlling the flow rate of operating oil to be supplied to a hydraulic extension/retraction cylinder to a selected flow rate. Boom 9 is provided with extension/retraction sensor 28 that detects the length of boom 9 and vehicle azimuth sensor 29 that detects an azimuth about the distal end of boom 9.

Camera 9b (see FIG. 2) that is a detecting apparatus takes the images of load W and planimetric features around load W. Camera 9b is provided at the distal end portion of boom 9. Camera 9b is configured to be capable of taking the images of load W and planimetric features and topographic features around crane 1 from vertically above load W.

Main hook block 10 and sub hook block 11 are used to hang load W. Main hook block 10 is provided with a plurality of hook sheaves around which main wire rope 14 is wound, and main hook 10a used to hang load W. Sub hook block 11 is provided with sub hook 11a used to hang load W.

Hydraulic luffing cylinder 12 that is an actuator luffs up and down boom 9 and holds the position of boom 9. In hydraulic luffing cylinder 12, an end of a cylinder part is swingably coupled to swivel base 7, and an end of a rod part is swingably coupled to the base boom member of boom 9. Hydraulic luffing cylinder 12 is operated to extend and retract by luffing valve 25 (see FIG. 2) that is an electromagnetic proportional switching valve. Luffing valve 25 is capable of controlling the flow rate of operating oil to be supplied to hydraulic luffing cylinder 12 to a selected flow rate. Boom 9 is provided with luffing sensor 30 (see FIG. 2) that detects the luffing angle of boom 9.

Main winch 13 and sub winch 15 wind up (reel up) and feed out (release) main wire rope 14 and sub wire rope 16, respectively. Main winch 13 has a configuration in which a main drum around which main wire rope 14 is wound is rotated by a main hydraulic motor (not illustrated) that is an actuator, and sub winch 15 has a configuration in which a sub drum around which sub wire rope 16 is wound is rotated by a sub hydraulic motor (not illustrated) that is an actuator.

The main hydraulic motor is operated to rotate by main valve 26m (see FIG. 2) that is an electromagnetic proportional switching valve. Main winch 13 is enabled to be operated to a selected wind-up and feed-out rate by controlling the main hydraulic motor with main valve 26m. Similarly, sub winch 15 is enabled to be operated to a selected wind-up and feed-out rate by controlling the sub hydraulic motor with sub valve 26s (see FIG. 2) that is an electromagnetic proportional switching valve.

Cabin 17 covers an operator compartment. Cabin 17 is mounted on swivel base 7. Cabin 17 is provided with an operator compartment (not illustrated). The operator compartment is provided with manipulation tools for operating to cause vehicle 2 to travel, swivel manipulation tool 18, luffing manipulation tool 19, extension/retraction manipulation tool 20, main-drum manipulation tool 21m, sub-drum manipulation tool 21s, and the like for operating crane apparatus 6 (see FIG. 2). Swivel manipulation tool 18 enables operation of hydraulic swivel motor 8. Luffing manipulation tool 19 enables operation of hydraulic luffing cylinder 12. Extension/retraction manipulation tool 20 enables operation of the hydraulic extension/retraction cylinder. Main-drum manipulation tool 21m enables operation of the main hydraulic motor. Sub-drum manipulation tool 21s enables operation of the sub hydraulic motor.

Communication device 22 (see FIG. 2) receives a control signal from remote operation terminal 32 and transmits control information and the like from crane apparatus 6. Communication device 22 is provided in cabin 17. Communication device 22 is configured to, when communication device 22 receives a control signal or the like from remote operation terminal 32, transfer the control signal or the like to control apparatus 31 via a communication line (not shown). Communication device 22 is also configured to transfer control information from control apparatus 31 or video image i from camera 9b to remote operation terminal 32 via the communication line (not shown).

Display apparatus 43 that is a display section displays an azimuth and a movement direction of a boom distal end. Display apparatus 43 is made up of an electronic display or the like that is capable of displaying a mark or character indicating an azimuth. Display apparatus 43 is made up of cylindrical or polygonal display apparatus 43 viewable from all around. Display apparatus 43 is controlled to maintain a horizontal state regardless of the luffing angle of boom 9. Display apparatus 43 displays "N" indicating the north direction, "E" indicating the east direction, "S" indicating the south direction, "W" indicating the west direction, or the like based on an azimuth obtained from vehicle azimuth sensor 29. Any display of an azimuth, such as color, icon, and blink signal, is applicable as long as an azimuth can be identified from the display.

Vehicle azimuth sensor 29 that is an azimuth detection section detects an azimuth about the distal end of boom 9 of crane apparatus 6. Vehicle azimuth sensor 29 is made up of a triaxial azimuth sensor. Vehicle azimuth sensor 29 calculates an absolute azimuth by detecting terrestrial magnetism. Vehicle azimuth sensor 29 is provided at the distal end part of boom 9.

Figure 2:
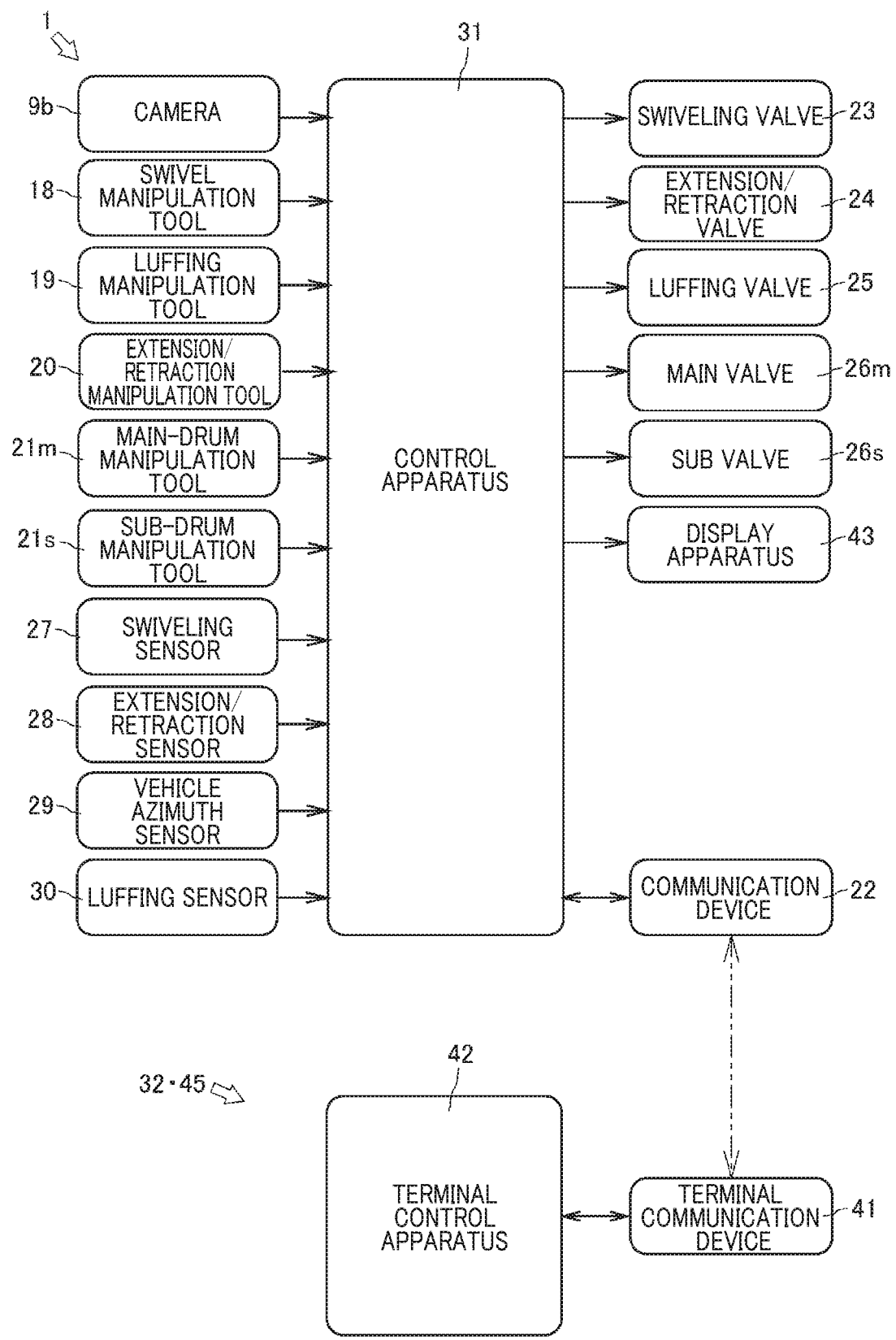
FIG. 2 is a block diagram illustrating the control configuration of the crane.

As shown in FIG. 2, control apparatus 31 controls the actuators of crane 1 via control valves. Control apparatus 31 is provided inside cabin 17. Substantively, control apparatus 31 may be made up of a CPU, ROM, RAM, HDD, and the like connected to one another via a bus or may be made up of a one-chip LSI or the like. Control apparatus 31 stores various programs and data in order to control the operations of the actuators, switching valves, sensors, and the like.

Control apparatus 31 is connected to camera 9b, swivel manipulation tool 18, luffing manipulation tool 19, extension/retraction manipulation tool 20, main-drum manipulation tool 21m, and sub-drum manipulation tool 21s, and is capable of obtaining video image i of camera 9b and obtaining the manipulation amount of each of swivel manipulation tool 18, luffing manipulation tool 19, main-drum manipulation tool 21m, and sub-drum manipulation tool 21s.

Control apparatus 31 is connected to communication device 22 and is capable of obtaining a control signal from remote operation terminal 32 and transmitting control information from the crane apparatus 6 and video image i or the like from camera 9b.

Control apparatus 31 is connected to swiveling valve 23, extension/retraction valve 24, luffing valve 25, main valve 26m, and sub valve 26s and is capable of transmitting control signals to swiveling valve 23, luffing valve 25, main valve 26m, and sub valve 26s.

Control apparatus 31 is connected to swiveling sensor 27, extension/retraction sensor 28, vehicle azimuth sensor 29, and luffing sensor 30 and is capable of obtaining the swivel position of swivel base 7, boom length, luffing angle, and an azimuth about the distal end of boom 9.

Control apparatus 31 is connected to display apparatus 43 and is capable of causing display apparatus 43 to display an azimuth obtained from vehicle azimuth sensor 29. Control apparatus 31 is also capable of calculating an azimuth, in which the distal end of boom 9 moves, from control signals transmitted to swiveling valve 23, luffing valve 25, main valve 26m, and sub valve 26s and causing display apparatus 43 to display the azimuth.

Control apparatus 31 generates control signals respectively associated with swivel manipulation tool 18, luffing manipulation tool 19, main-drum manipulation tool 21m, and sub-drum manipulation tool 21s based on the manipulation amounts of the associated manipulation tools.

Thus configured crane 1 is capable of moving crane apparatus 6 to a selected position by causing vehicle 2 to travel. Crane 1 is capable of expanding the lifting height and the movement radius of crane apparatus 6 by luffing up boom 9 to a selected luffing angle with hydraulic luffing cylinder 12 by manipulation of luffing manipulation tool 19 and extending boom 9 to a selected boom 9 length by manipulation of extension/retraction manipulation tool 20. Crane 1 is also capable of conveying load W by hoisting up load W with sub-drum manipulation tool 21s and the like and swiveling swivel base 7 by manipulation of swivel manipulation tool 18.

Next, remote operation terminal 32 will be described with reference to FIGS. 3 to 5A and 5B.

Figure 3:
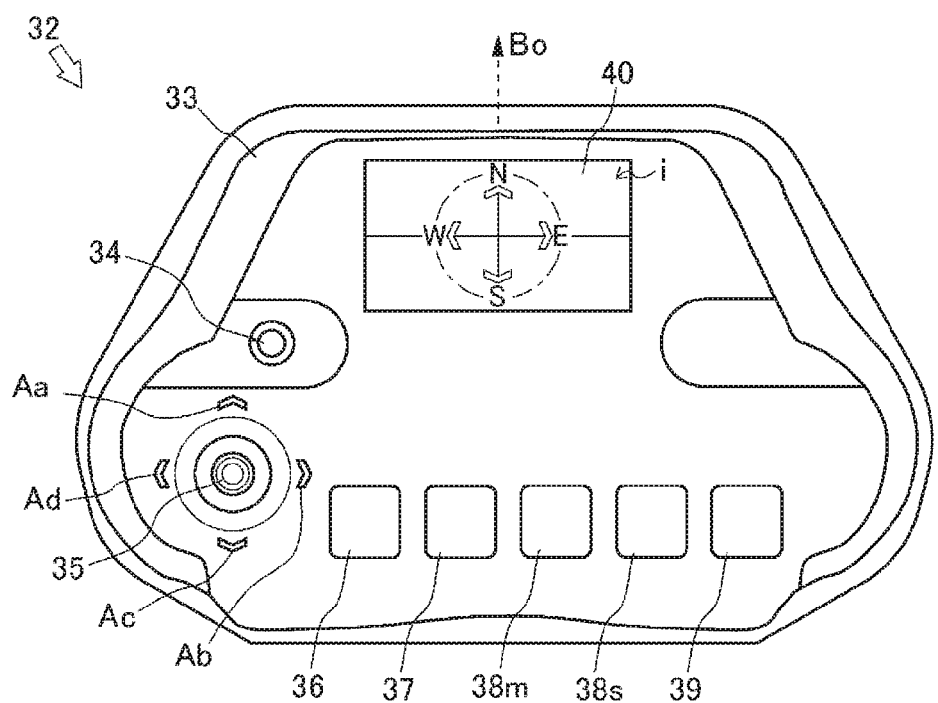
FIG. 3 is a plan view illustrating the schematic configuration of a remote operation terminal.

As shown in FIG. 3, remote operation terminal 32 is used in remotely operating crane 1. Remote operation terminal 32 includes case 33, suspended load movement manipulation tool 35 that is a first manipulation section provided on an operating face of case 33, reference change manipulation tool 34 that is a second manipulation section, terminal swivel manipulation tool 36, terminal extension/retraction manipulation tool 37, terminal main-drum manipulation tool 38m, terminal sub-drum manipulation tool 38s, terminal luffing manipulation tool 39, terminal display apparatus 40, terminal communication device 41, terminal control apparatus 42 (see FIGS. 2 and 4), and the like. Remote operation terminal 32 sets manipulation direction reference Bo with reference change manipulation tool 34 and transmits control signals for the valves of the actuators to move load W by manipulation of suspended load movement manipulation tool 35 or various manipulation tools to crane apparatus 6.

Manipulation direction reference Bo of remote operation terminal 32 is a reference for setting the azimuth of load W to be moved by tilting manipulation of suspended load movement manipulation tool 35 in a selected direction. Specifically, manipulation direction reference Bo is a reference for setting correction angle θ1 from the north direction for correcting the movement direction of load W (the movement direction of crane apparatus 6) that moves as a result of tilting manipulation of suspended load movement manipulation tool 35 in a selected direction. In the present embodiment, manipulation direction reference Bo of remote operation terminal 32 is set to an upward manipulation direction (see the dashed-line arrow) when facing the operating face of case 33.

Case 33 is a main component member of remote operation terminal 32. Case 33 has such a size that an operator is able to hold by hand. Case 33 is provided on its operating face with suspended load movement manipulation tool 35, reference change manipulation tool 34, terminal swivel manipulation tool 36, terminal extension/retraction manipulation tool 37, terminal main-drum manipulation tool 38m, terminal sub-drum manipulation tool 38s, terminal luffing manipulation tool 39, terminal display apparatus 40, and terminal communication device 41 (see FIGS. 2 and 4).

Reference change manipulation tool 34 that is the second manipulation section receives an instruction to change an azimuth with respect to manipulation direction reference Bo. Reference change manipulation tool 34 is made up of a rotary knob protruding from the operating face of case 33 and a sensor (not illustrated) that detects the rotation direction and the rotation amount, that is, the rotation position of the rotary knob. Reference change manipulation tool 34 is configured such that the rotary knob can be manipulated to rotate in a selected direction. Reference change manipulation tool 34 is configured to transmit, to terminal control apparatus 42, a signal on correction angle θ1 (see FIG. 5A) that is the angle between the north direction and manipulation direction reference Bo by using the rotation position of the rotary knob.

Suspended load movement manipulation tool 35 that is the first manipulation section receives an instruction to move load W at a selected rate in a selected direction in a selected horizontal plane. Suspended load movement manipulation tool 35 is made up of a manipulation stick upright substantially vertically from the operating face of case 33 and a sensor (not illustrated) that detects the tilting direction and the tilting amount of the manipulation stick. Suspended load movement manipulation tool 35 is configured such that the manipulation stick can be manipulated to tilt in a selected direction. Suspended load movement manipulation tool 35 is configured to transmit, to terminal control apparatus 42, a signal on tilting angle θ2 (see FIG. 5B) between the tilting direction of the manipulation stick, detected by the sensor, and manipulation direction reference Bo and its tilting amount. Arrow Aa indicating an upward direction when facing the operating face of case 33, arrow Ab indicating a right-hand direction when facing the operating face, arrow Ac indicating a downward direction when facing the operating face, and arrow Ad indicating a left-hand direction when facing the operating face are shown on suspended load movement manipulation tool 35 as a guide for tilting angle θ2 of suspended load movement manipulation tool 35.

Terminal swivel manipulation tool 36 receives an instruction to swivel crane apparatus 6 at a selected movement rate in a selected movement direction. Terminal swivel manipulation tool 36 is made up of a manipulation stick upright substantially vertically from the operating face of case 33 and a sensor (not illustrated) that detects the tilting direction and the tilting amount of the manipulation stick. Terminal swivel manipulation tool 36 is configured to be able to tilt in each of a direction to provide an instruction to swivel to the left and a direction to provide an instruction to swivel to the right.

Terminal extension/retraction manipulation tool 37 receives an instruction to extend or retract boom 9 at a selected rate. Terminal extension/retraction manipulation tool 37 is made up of a manipulation stick upright from the operating face of case 33 and a sensor (not illustrated) that detects the tilting direction and the tilting amount of the manipulation stick. Terminal extension/retraction manipulation tool 37 is configured to be able to tilt in each of a direction to provide an instruction to extend and a direction to provide an instruction to retract.

Terminal main-drum manipulation tool 38m receives an instruction to rotate main winch 13 at a selected rate in a selected direction. Terminal main-drum manipulation tool 38m is made up of a manipulation stick upright from the operating face of case 33 and a sensor (not illustrated) that detects the tilting direction and the tilting amount of the manipulation stick. Terminal main-drum manipulation tool 38m is configured to be able to tilt in each of a direction to provide an instruction to wind up main wire rope 14 and a direction to provide an instruction to feed out main wire rope 14. Terminal sub-drum manipulation tool 38s is also similarly configured.

Terminal luffing manipulation tool 39 receives an instruction to luff up or down boom 9 at a selected rate. Terminal luffing manipulation tool 39 is made up of a manipulation stick upright from the operating face of case 33 and a sensor (not illustrated) that detects the tilting direction and the tilting amount of the manipulation stick. Terminal luffing manipulation tool 39 is configured to be able to tilt in each of a direction to provide an instruction to luff up and a direction to provide an instruction to luff down.

Terminal display apparatus 40 displays various pieces of information, such as information on the position of crane 1 and information on load W. Terminal display apparatus 40 is made up of image display apparatus 43, such as a liquid crystal screen. Terminal display apparatus 40 is provided on the operating face of case 33. The azimuth of manipulation direction reference Bo of remote operation terminal 32 is shown on terminal display apparatus 40. Display of the azimuth is rotated in synchronization with the rotation position of reference change manipulation tool 34. In other words, the relative positional relation between an azimuth and manipulation direction reference Bo (see the continuous-line arrow) that reflects the rotation direction and the rotation amount of reference change manipulation tool 34 is displayed on terminal display apparatus 40.

Arrow Aa indicating an upward direction when facing the operating face of case 33, arrow Ab indicating a right-hand direction when facing the operating face, arrow Ac indicating a downward direction when facing the operating face, and arrow Ad indicating a left-hand direction when facing the operating face are shown on terminal display apparatus 40 as a guide for tilting angle θ2 of suspended load movement manipulation tool 35.

Figure 4:
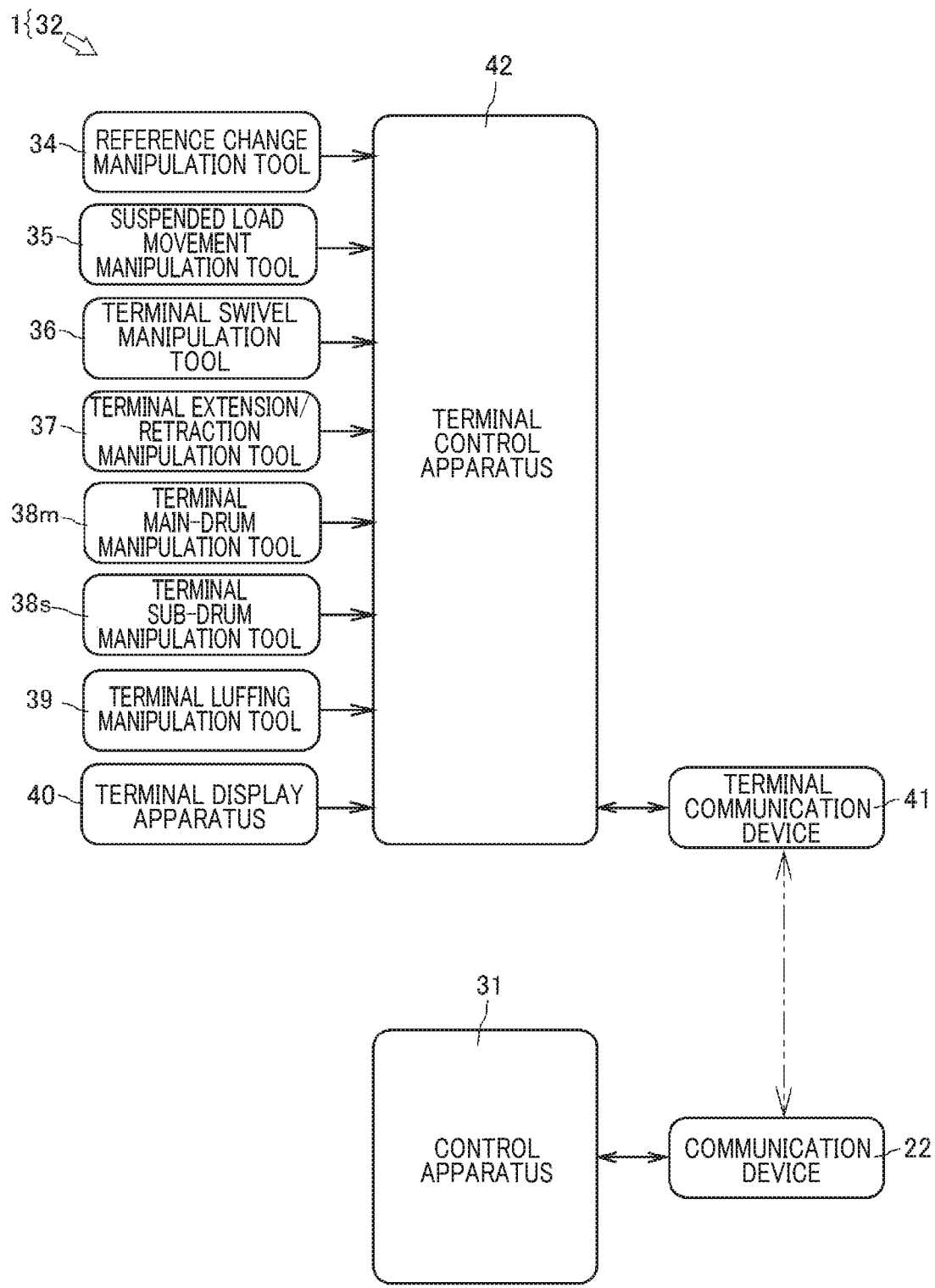
FIG. 4 is a block diagram illustrating the control configuration of the remote operation terminal.

As shown in FIG. 4, terminal communication device 41 receives control information and the like of crane apparatus 6 and transmits control information and the like from remote operation terminal 32. Terminal communication device 41 is provided inside case 33. Terminal control apparatus 41 is configured to, when terminal communication device 41 receives video image i, a control signal, or the like from crane apparatus 6, transmit video image i, the control signal, or the like to terminal control apparatus 42. Terminal communication device 41 is also configured to transmit control information from terminal control apparatus 42 to crane apparatus 6 of crane 1.

Terminal control apparatus 42 that is a control section controls remote operation terminal 32. Terminal control apparatus 42 is provided inside case 33 of remote operation terminal 32. Substantively, terminal control apparatus 42 may be made up of a CPU, ROM, RAM, HDD, and the like connected to one another via a bus or may be made up of a one-chip LSI or the like. Terminal control apparatus 42 stores various programs and data in order to control the operations of suspended load movement manipulation tool 35, reference change manipulation tool 34, terminal swivel manipulation tool 36, terminal extension/retraction manipulation tool 37, terminal main-drum manipulation tool 38m, terminal sub-drum manipulation tool 38s, terminal luffing manipulation tool 39, terminal display apparatus 40, terminal communication device 41, and the like.

Terminal control apparatus 42 is connected to suspended load movement manipulation tool 35, terminal swivel manipulation tool 36, terminal extension/retraction manipulation tool 37, terminal main-drum manipulation tool 38m, terminal sub-drum manipulation tool 38s, and terminal luffing manipulation tool 39 and is capable of obtaining a manipulation signal composed of the tilting direction and the tilting amount of the manipulation stick of each manipulation tool. Terminal control apparatus 42 is also connected to reference change manipulation tool 34 and is capable of obtaining a manipulation signal composed of the rotation direction and the rotation angle, that is, the rotation position of reference change manipulation tool 34.

Terminal control apparatus 42 is capable of generating control signals from manipulation signals of the manipulation sticks, obtained from the sensors of terminal swivel manipulation tool 36, terminal extension/retraction manipulation tool 37, terminal main-drum manipulation tool 38m, terminal sub-drum manipulation tool 38s, and terminal luffing manipulation tool 39 for associated swiveling valve 23, extension/retraction valve 24, luffing valve 25, main valve 26m, and sub valve 26s.

Terminal control apparatus 42 is connected to terminal display apparatus 40 and is capable of causing terminal display apparatus 40 to display video image i and various pieces of information from crane apparatus 6. Terminal control apparatus 42 is capable of rotating display of an azimuth in synchronization with correction angle θ1 and a rotation direction obtained from the rotation position of the rotary knob of reference change manipulation tool 34. Terminal control apparatus 42 is connected to terminal communication device 41 and is capable of transmitting or receiving various pieces of information to or from communication device 22 of crane apparatus 6 via terminal communication device 41.

Figure 5A:
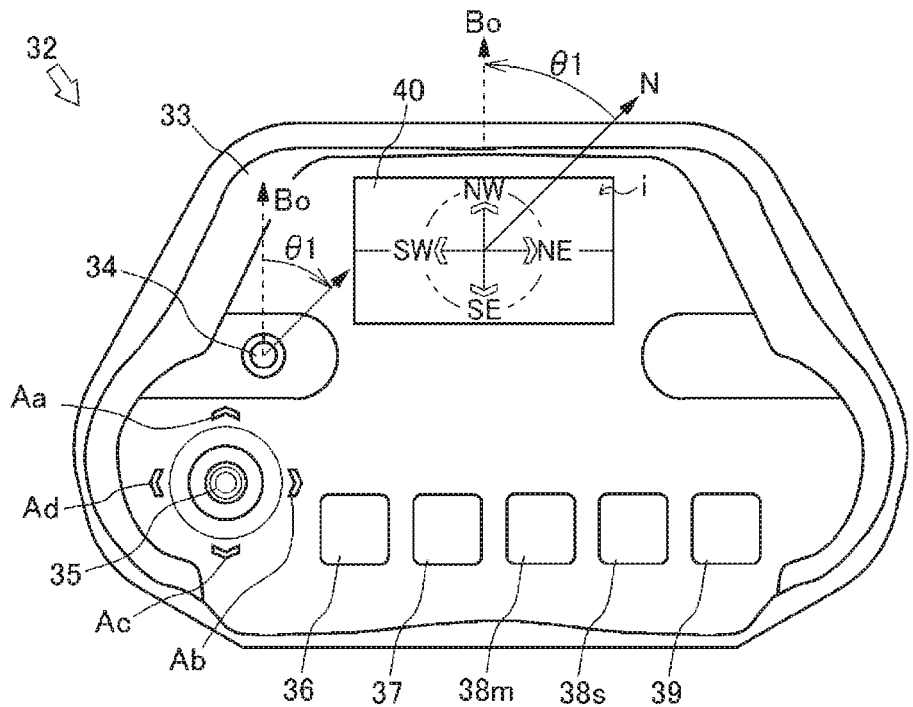
FIG. 5A is a view illustrating an azimuth of a manipulation direction reference when a reference change manipulation tool of the remote operation terminal is manipulated.

As shown in FIG. 5A, terminal control apparatus 42 (see FIG. 4) relatively rotates manipulation direction reference Bo with respect to the north direction based on a manipulation signal on the rotation direction that is the rotation position obtained from reference change manipulation tool 34 manipulated to rotate and correction angle θ1 that is the angle from the north direction. For example, when reference change manipulation tool 34 is manipulated to rotate to a position of 45° as angle θ1 in one direction (right-hand direction in FIG. 5A), terminal control apparatus 42 corrects the azimuth of manipulation direction reference Bo into the north-west direction by rotating manipulation direction reference Bo by 45° as correction angle θ1 in the other direction (left-hand direction in FIG. 5A) from the north direction as a correction direction. At this time, terminal control apparatus 42 rotates display of the azimuth displayed on terminal display apparatus 40 to the position of the correction angle θ1=45° in one direction (right-hand direction in FIG. 5A) based on a manipulation signal on correction angle θ1 from reference change manipulation tool 34. In other words, on terminal display apparatus 40, the north-west direction is shown in the upward direction on the operating face, which is the azimuth of manipulation direction reference Bo.

Figure 5B:
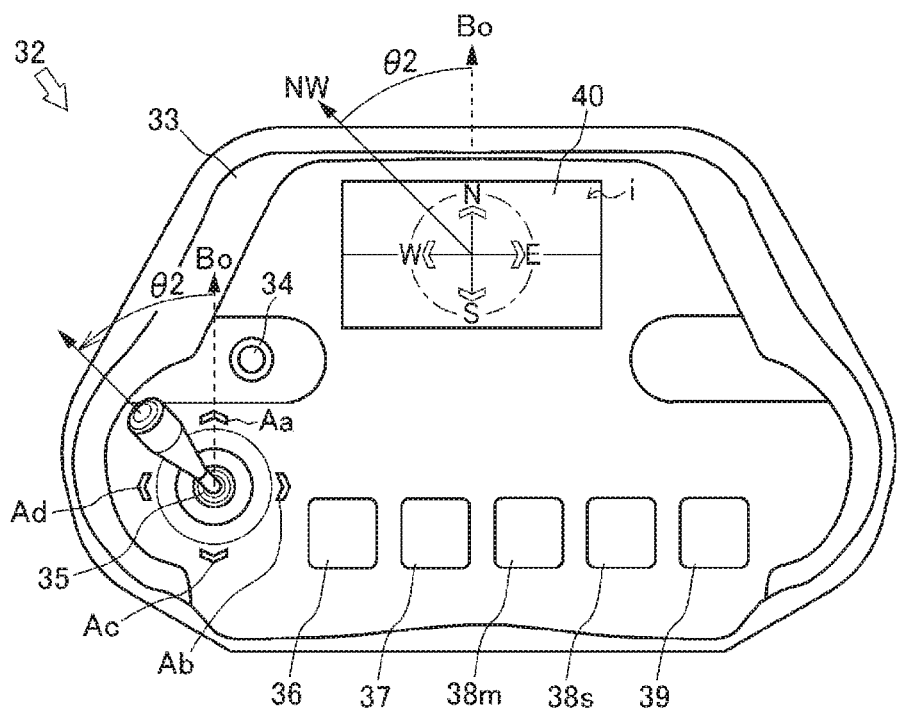
FIG. 5B is a view illustrating an azimuth in which a load is conveyed when a suspended load movement manipulation tool is manipulated.

As shown in FIG. 5B, terminal control apparatus 42 (see FIG. 4) calculates the movement direction and the movement rate of load W from manipulation direction reference Bo based on a manipulation signal on tilting angle θ2 that is an angle from manipulation direction reference Bo to the tilting direction of the manipulation stick, the tilting direction, and a tilting amount, obtained from suspended load movement manipulation tool 35. When, for example, suspended load movement manipulation tool 35 is manipulated to tilt by 45° as tilting angle $\theta 2$ to one of the right and left sides of manipulation direction reference Bo in a state where manipulation direction reference Bo is set to the north direction, terminal control apparatus 42 calculates movement angle $\theta=\theta 1$ (=0°)+$\theta 2$ (=45°) of load W with respect to the north direction from correction angle $\theta 1$ (in FIG. 5B, correction angle $\theta 1$ is 0°) and its correction direction (no correction direction is set because correction angle $\theta 1$ is 0° in FIG. 5B), set by reference change manipulation tool 34, and tilting angle $\theta 2$. Terminal control apparatus 42 calculates a control signal for moving load W at a movement rate according to the tilting amount to the north west that is the direction of the movement angle $\theta=45°$.

Next, setting of manipulation direction reference Bo in remote operation terminal 32 and control of crane apparatus 6 by using remote operation terminal 32 will be described with reference to FIGS. 6 and 7. As the directions of vehicle 2 of crane 1, a forward travel direction of vehicle 2 (a direction toward cabin 17 from boom 9) is defined as forward direction, a reverse travel direction (a direction across boom 9) is defined as rearward direction, a right-hand side when facing the forward direction is defined as right-hand direction, and a left-hand side when facing the forward direction is defined as left-hand direction. In the present embodiment, it is assumed that manipulation direction reference Bo (the dashed-line arrows in FIGS. 5A and 5B to 8A and 8B) of remote operation terminal 32 is set to the upward manipulation direction (arrow Aa direction shown on suspended load movement manipulation tool 35 and terminal display apparatus 40) when facing the operating face of case 33. It is assumed that, for correction angle $\theta 1$ and tilting angle $\theta 2$, the left-hand direction from arrow Aa direction is defined as positive direction, the right-hand direction from arrow Aa direction is defined as negative direction, and the sign is used in adding or subtracting angles.

Figure 6:
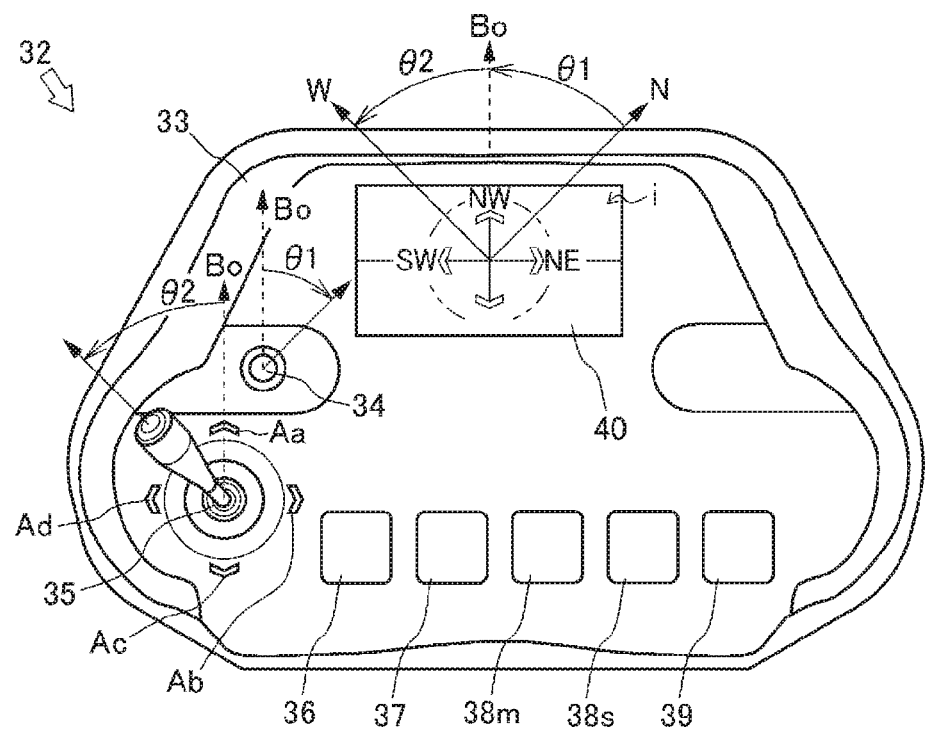
FIG. 6 is a schematic view illustrating the remote operation terminal in which the suspended load movement manipulation tool is manipulated and a state of movement of the crane resulting from the manipulation.

As shown in FIG. 6, when reference change manipulation tool 34 is manipulated to rotate by correction angle $\theta 1=45°$ in the right-hand direction (see FIG. 5A) in accordance with positioning of crane 1 as a rotation position in which the north direction and manipulation direction reference Bo do not coincide with each other, remote operation terminal 32 corrects manipulation direction reference Bo to the position rotated by correction angle $\theta 1=45°$ in the left-hand direction that is a correction direction from the north direction. In other words, for remote operation terminal 32, manipulation direction reference Bo is set to the north-west direction that is the position rotated by correction angle $\theta 1=45°$ from the north direction to the west direction. At this time, on terminal display apparatus 40 of remote operation terminal 32, "NW" indicating the north west, which is display of the azimuth, is shown in arrow Aa direction that is manipulation direction reference Bo.

When, for example, suspended load movement manipulation tool 35 of remote operation terminal 32 is manipulated to tilt by a selected tilting amount in the direction of tilting angle $\theta 2=45°$ in the left-hand direction from arrow Aa that is manipulation direction reference Bo as a tilting manipulation of suspended load movement manipulation tool 35 in a selected direction, terminal control apparatus 42 obtains, from the sensor (not shown) of suspended load movement manipulation tool 35, a manipulation signal on tilting angle $\theta 2=45°$ that is the angle from manipulation direction reference Bo to the tilting direction in the left-hand direction (positive direction) of the manipulation stick, and the tilting amount. In addition, terminal control apparatus 42 calculates a control signal to move load W in the movement direction of movement angle $\theta$=correction angle $\theta 1$+ tilting angle $\theta 2=90°$, that is, the west direction, at a movement rate according to the tilting amount from the obtained manipulation signal and correction angle $\theta 1=45°$ in the left-hand direction (positive direction), which is a correction amount from the north direction that is manipulation direction reference Bo. Remote operation terminal 32 generates control signals for associated swiveling valve 23, extension/retraction valve 24, luffing valve 25, main valve 26m, and sub valve 26s based on movement angle $\theta$ and the tilting amount, calculated in terminal control apparatus 42, and transmits the control signals to crane 1 by using terminal communication device 41.

Terminal control apparatus 42 does not execute a process of rotating manipulation direction reference Bo at the time when a manipulation signal on correction angle $\theta 1$ is obtained from reference change manipulation tool 34 while obtaining a manipulation signal on the tilting direction, tilting angle $\theta 2$ and the tilting amount of suspended load movement manipulation tool 35, that is, while generating a control signal for crane apparatus 6 to move load W.

When crane 1 receives a control signal for movement angle $\theta$ and the movement rate according to the tilting amount of load W from remote operation terminal 32, crane 1 moves load W at a rate according to the tilting amount in the direction of movement angle $\theta$. Since suspended load movement manipulation tool 35 is tilted by a predetermined tilting amount at tilting angle $\theta 2$ from arrow Aa in the left-hand direction (positive direction), crane 1 moves load W in the west direction that is the direction of movement angle $\theta$=correction angle $\theta 1$+ tilting angle $\theta 2=90°$ from the north direction at a conveyance rate corresponding to the tilting amount of suspended load movement manipulation tool 35. At this time, crane 1 controls hydraulic swivel motor 8, the hydraulic retraction cylinder, hydraulic luffing cylinder 12, the main hydraulic motor, and the like in accordance with a movement path of load W.

Figure 7:
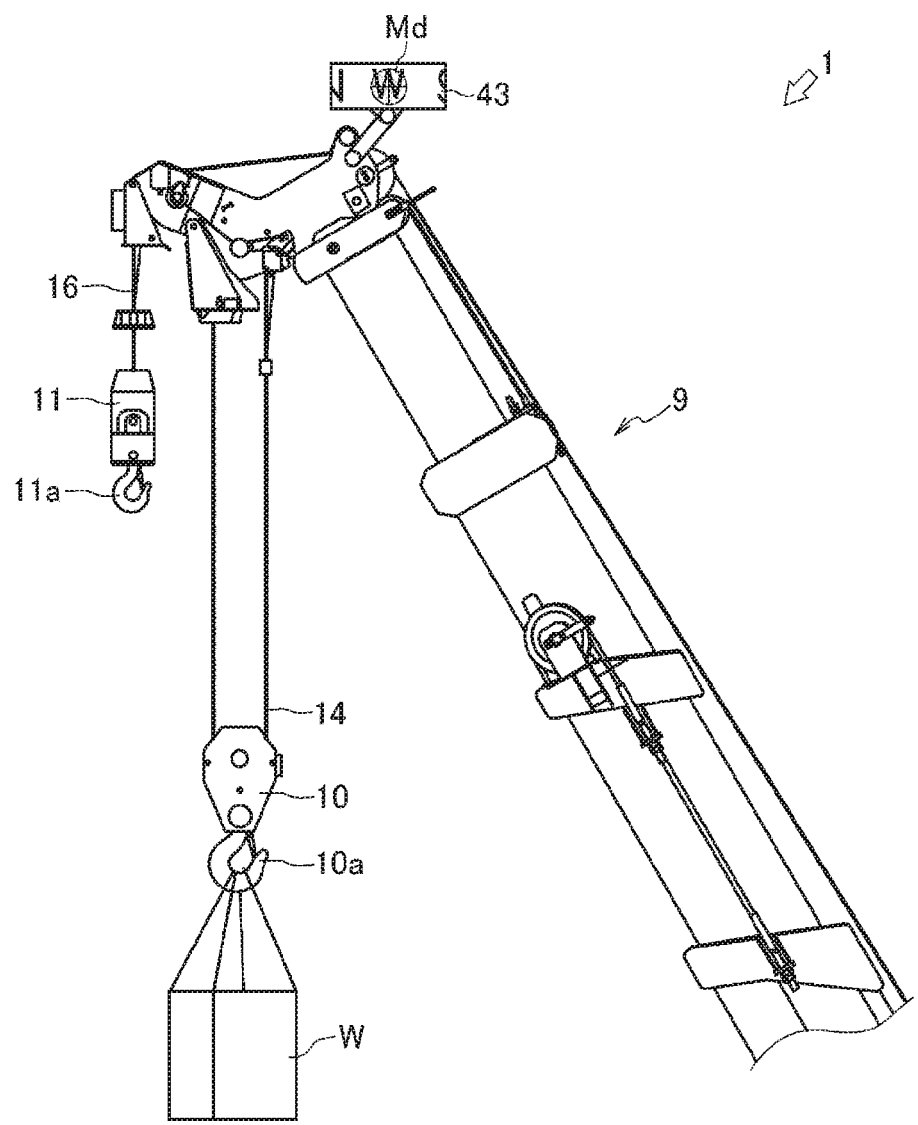
FIG. 7 is a partially enlarged view illustrating a display mode of a display apparatus in the crane.

As shown in FIG. 7, when crane 1 receives a manipulation signal for movement angle $\theta$ of load W from remote operation terminal 32, display apparatus 43 displays a direction in which boom 9 of crane 1 moves in addition to the already shown display indicating the azimuth. In the present embodiment, crane 1 causes display apparatus 43 to display direction mark Md that emits light in a selected color in an azimuth in which boom 9 moves.

With such a configuration, in crane 1, an operator sets manipulation direction reference Bo of remote operation terminal 32 to a selected value with reference change manipulation tool 34 in accordance with a state of positioning of crane 1, so the operator does not lose the identified movement direction of crane apparatus 6 for the manipulation direction of suspended load movement manipulation tool 35. At this time, terminal display apparatus 40 of remote operation terminal 32 displays an azimuth with respect to manipulation direction reference Bo, so the operator more easily visually grasp the relation between the azimuth and manipulation direction reference Bo. Furthermore, an azimuth is displayed by display apparatus 43 and the movement azimuth of boom 9 is displayed at the distal end of boom 9 of crane 1, so the operator easily inputs a movement azimuth while seeing the distal end of boom 9. Remote operation terminal 32 is disabled to change manipulation direction reference Bo set to a selected direction with reference change manipulation tool 34 by manipulation of reference change manipulation tool 34 while suspended load movement manipulation tool 35 is being manipulated, so the operator does not lose the identified movement direction of crane apparatus 6 for the manipulation direction of suspended load movement manipulation tool 35. Thus, erroneous manipulation during remote operation of crane apparatus 6 is prevented, and it is possible to easily and simply perform remote operation of the work apparatus.

Next, a mode of display of video image i of load W by means of camera 9b will be described with reference to FIGS. 8A, 8B, and 9. Crane 1 is capable of causing terminal display apparatus 40 of remote operation terminal 32 to display video image i from camera 9b provided at the distal end portion of boom 9.

Terminal control apparatus 42 (see FIG. 4) of remote operation terminal 32 is capable of obtaining video image i taken by camera 9b via terminal communication device 41. Terminal control apparatus 42 is also capable of displaying positioning mark Ma in the obtained image (see FIGS. 8A and 8B). Terminal control apparatus 42 is capable of rotating obtained video image i in accordance with a manipulation signal of reference change manipulation tool 34 and causing terminal display apparatus 40 to display video image i (see FIGS. 8A and 8B). Terminal control apparatus 42 is capable of displaying movement mark Mt in accordance with the obtained manipulation signal of suspended load movement manipulation tool 35 (see FIG. 9).

Figure 8A:
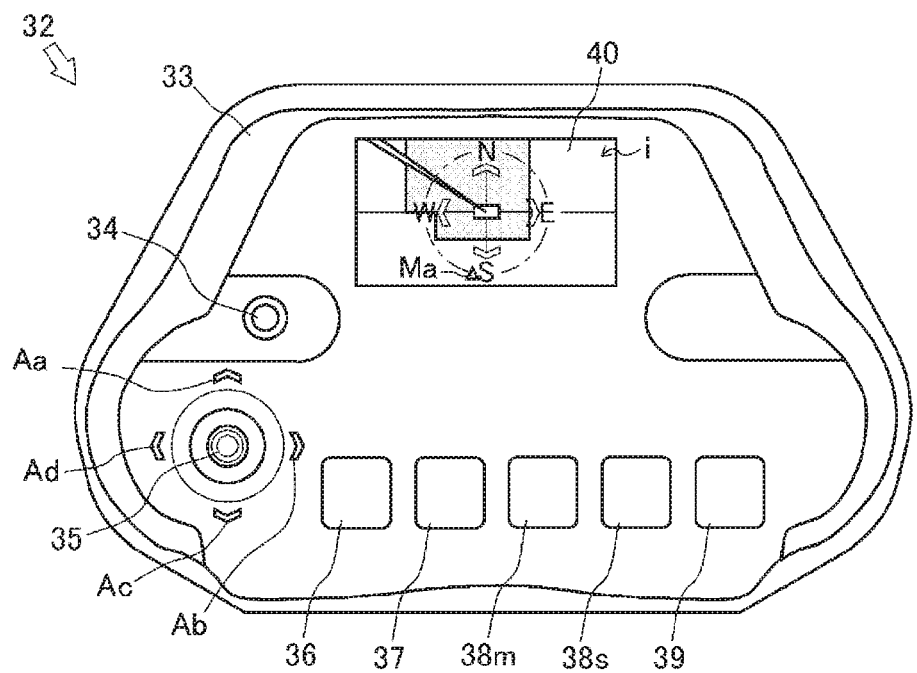
FIG. 8A is an enlarged view illustrating a video image from a camera, displayed on the remote operation terminal.

As shown in FIG. 8A, in addition to display of the azimuth, the video image i from vertically above load W, which is being taken by camera 9b, is displayed on terminal display apparatus 40. Video image i contains video image i in a predetermined area about load W. In addition to video image i in a predetermined area about load W, positioning mark Ma (triangle mark in the present embodiment) indicating a positioned direction of vehicle 2 or crane apparatus 6 is shown on terminal display apparatus 40. Thus, an operator is able to constantly grasp the positioned direction of vehicle 2 or crane apparatus 6 from load W on video image i regardless of the orientation of camera 9b with respect to vehicle 2 or crane apparatus 6. The frame shape of video image i to be displayed on terminal display apparatus 40 may be rectangular or circular.

Furthermore, in addition to video image i in a predetermined area about load W, movement mark Mt (solid arrow in FIG. 9) indicating the movement direction and the movement rate of load W may be displayed on terminal display apparatus 40 in accordance with the tilting direction of suspended load movement manipulation tool 35. Thus, an operator is able to constantly grasp the movement direction of load W on video image i regardless of the orientation of camera 9b with respect to vehicle 2 or crane apparatus 6.

Terminal control apparatus 42 of remote operation terminal 32 is capable of obtaining video image i taken by camera 9b via terminal communication device 41. Terminal control apparatus 42 is also capable of displaying positioning mark Ma in the obtained image. Terminal control apparatus 42 is capable of rotating obtained video image i in accordance with a manipulation signal of reference change manipulation tool 34 and causing terminal display apparatus 40 to display the video image i. Terminal control apparatus 42 is capable of displaying movement mark Mt in accordance with the obtained manipulation signal of suspended load movement manipulation tool 35.

Figure 8B:
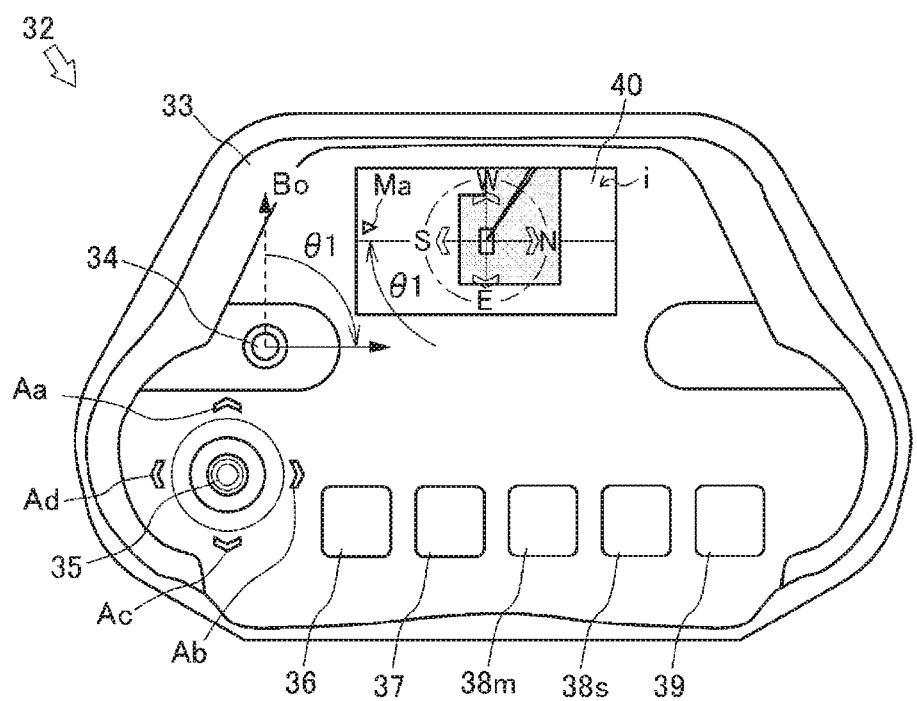
FIG. 8B is an enlarged view illustrating a video image from the camera, displayed on the remote operation terminal when a reference change manipulation tool of the remote operation terminal is manipulated.

As shown in FIG. 8B, when terminal control apparatus 42 of remote operation terminal 32 receives a manipulation signal on the rotation direction that is the rotation position obtained from reference change manipulation tool 34 manipulated to rotate and correction angle $\theta 1$ that is the angle from the north direction, terminal control apparatus 42 rotates display of the azimuth and video image i, displayed on terminal display apparatus 40, by correction angle $\theta 1$. When, for example, reference change manipulation tool 34 is manipulated to rotate from manipulation direction reference Bo to the position of angle $\theta 1=90°$ in one direction (right-hand direction in FIG. 5A), terminal control apparatus 42 rotates video image i and positioning mark Ma by correction angle $\theta 1=90°$ in one direction and causes terminal display apparatus 40 to display video image i and positioning mark Ma.

Figure 9:
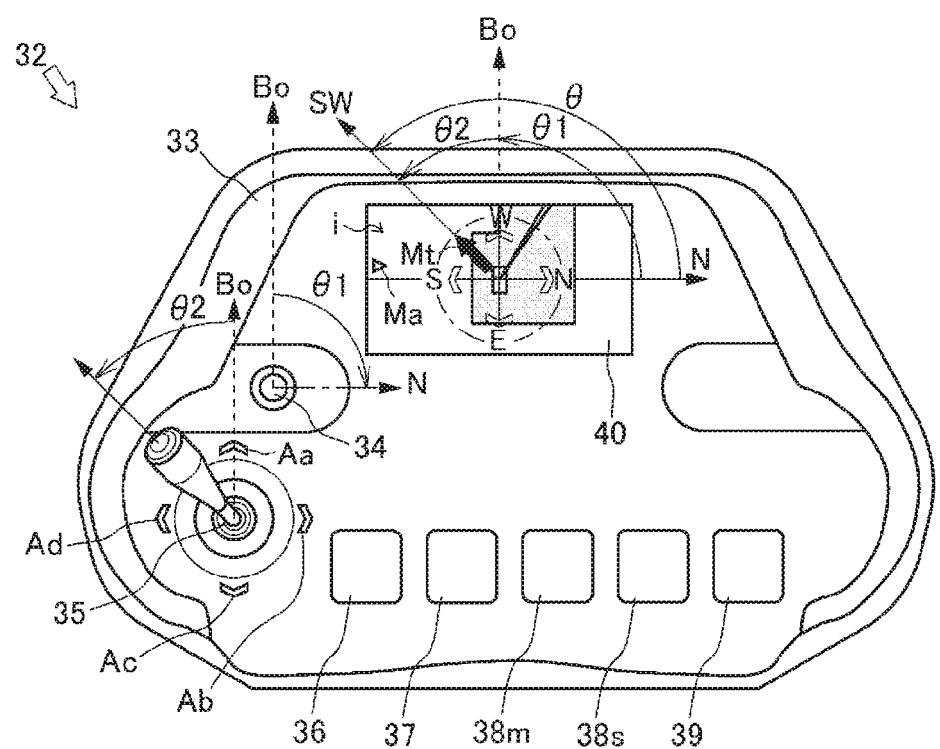
FIG. 9 is an enlarged view illustrating a conveyance direction of a load when the suspended load movement manipulation tool is manipulated.

As shown in FIG. 9, when terminal control apparatus 42 of remote operation terminal 32 obtains a manipulation signal on tilting angle $\theta 2$, which is the angle from manipulation direction reference Bo to the tilting direction of the manipulation stick, the tilting direction, and the tilting amount, obtained from suspended load movement manipulation tool 35, terminal control apparatus 42 causes terminal display apparatus 40 to display an arrow that points the movement direction of load W as movement mark Mt in size according to the movement rate of load W. When, for example, suspended load movement manipulation tool 35 is manipulated to tilt by tilting angle $\theta 2=45°$ to one of the right and left sides of manipulation direction reference Bo, terminal control apparatus 42 displays movement mark Mt (solid arrow) that indicates the south-west direction that is the movement direction of movement angle $\theta=135°$ with respect to the north direction, calculated from correction angle $\theta 1=90°$ and its correction direction, set by reference change manipulation tool 34, and tilting angle $\theta 2=45°$, and that indicates the movement rate.

Terminal control apparatus 42 of remote operation terminal 32 does not execute a process of rotating video image i and positioning mark Ma at the time when a manipulation signal on correction angle $\theta 1$ is obtained from reference change manipulation tool 34 while obtaining a manipulation signal on the tilting direction, tilting angle $\theta 2$ and the tilting amount of suspended load movement manipulation tool 35, that is, while generating a control signal for crane apparatus 6 to move load W.

With such a configuration, an operator constantly identifies the positioned direction of crane 1 in video image i with positioning mark Ma and constantly identifies the movement direction and the movement rate of load W with movement mark Mt, so the operator easily grasps the positional relation among crane 1, load W, and its surroundings. Thus, in crane 1, it is possible to easily and simply perform remote operation of crane apparatus 6.

In the present embodiment, when crane apparatus 6 is operated by using a plurality of remote operation terminals 32, the azimuth of manipulation direction reference Bo may be set for each of remote operation terminals 32. Terminal display apparatus 40 may be caused to display space coordinates by means of 3D mapping and display the azimuth in a superimposed manner.

The above-described embodiment is only a typical mode and may be modified in various forms without departing from the main point of one embodiment. Furthermore, the present invention can be, of course, implemented in various forms, and the scope of the present invention is described in the claims and encompasses equivalents of the claims and all modifications within the scope.

INDUSTRIAL APPLICABILITY

The present invention is applicable to a remote operation terminal and a work vehicle provided with a remote operation terminal.

REFERENCE SIGNS LIST

1 Crane
6 Crane apparatus
31 Control apparatus
32 Remote operation terminal
34 Reference change manipulation tool
35 Suspended load movement manipulation tool
42 Terminal control apparatus

The invention claimed is:

1. A work vehicle provided with a crane apparatus that is remotely operated, the work vehicle comprising:
    an azimuth detection sensor configured to detect an absolute azimuth about the crane apparatus;
    a remote operation terminal including a first manipulation tool used to remotely operate the crane apparatus and a second manipulation tool used to set a reference of an absolute azimuth of the crane apparatus as a result of manipulation of the first manipulation tool;
    a hardware processor that is configured to be capable of communicating with the remote operation terminal and control movement of the crane apparatus; and
    an electronic display that is mounted on the crane apparatus,
    wherein when the hardware processor obtains, from the remote operation terminal, a signal of an absolute azimuth in which the crane apparatus moves for manipulation of the first manipulation tool and which is calculated based on a set value of the second manipulation tool, the hardware processor is configured to cause the crane apparatus to move toward an absolute azimuth instructed by the remote operation terminal using, as a reference, the absolute azimuth detected by the azimuth detection sensor,
    wherein the set value of the second manipulation tool is a set value for correcting the absolute azimuth corresponding to a reference direction on an operating face of the remote operation terminal,
    wherein the absolute azimuth in which the crane apparatus moves is calculated so as to correspond to an angle difference between the reference direction on the operating face of the remote operation terminal and a manipulation direction of manipulation made on the first manipulation tool, and
    wherein the hardware processor is configured to cause the electronic display to display the absolute azimuth about the crane apparatus, which is detected by the azimuth detection sensor, and when the hardware processor obtains, from the remote operation terminal, the signal of the absolute azimuth in which the crane apparatus moves, the hardware processor causes the electronic display to display the absolute azimuth in which the crane apparatus moves.

2. The work vehicle according to claim 1, wherein
    the first manipulation tool is a manipulation stick configured to receive tilting manipulation of an operator, and
    the second manipulation tool is a rotary knob configured to receive rotating manipulation of an operator.

3. The work vehicle according to claim 1, wherein
    the remote operation terminal includes a terminal electronic display configured to display a video image of a camera that takes from vertically above an image of a load hanged by the crane apparatus, and
    the terminal electronic display is configured to rotate the video image such that the video image corresponds to the set value set by the second manipulation tool.

4. The work vehicle according to claim 1, wherein the remote operation terminal is configured to disable a change of the set value with the second manipulation tool while the first manipulation tool is being manipulated.

* * * * *